Aug. 11, 1931.      Q. G. NOBLITT      1,818,268
HEATING APPARATUS FOR VEHICLES
Filed Aug. 17, 1929      2 Sheets-Sheet 1
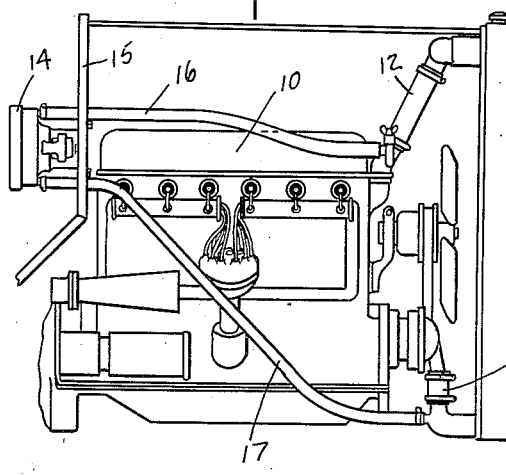
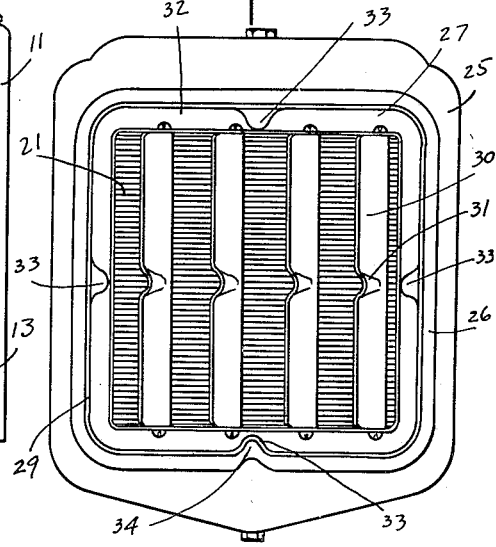
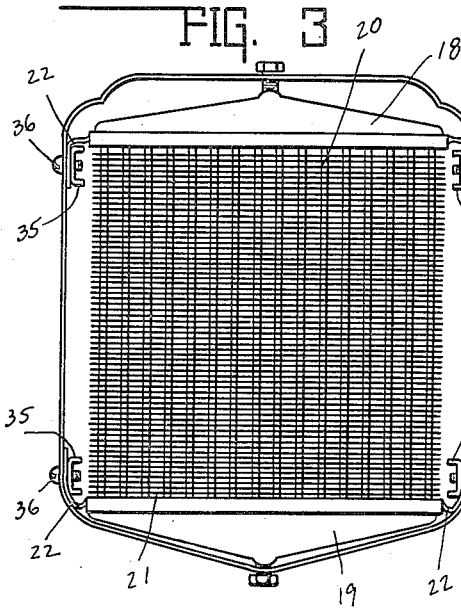
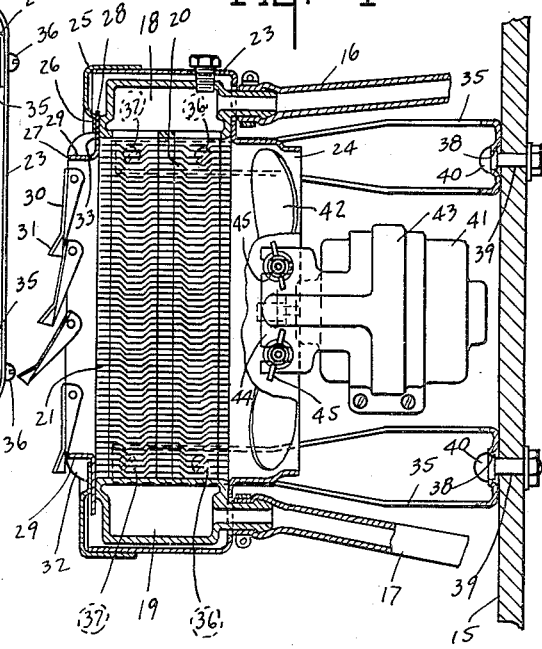
INVENTOR.
QUINTIN G. NOBLITT.
BY
ATTORNEYS.

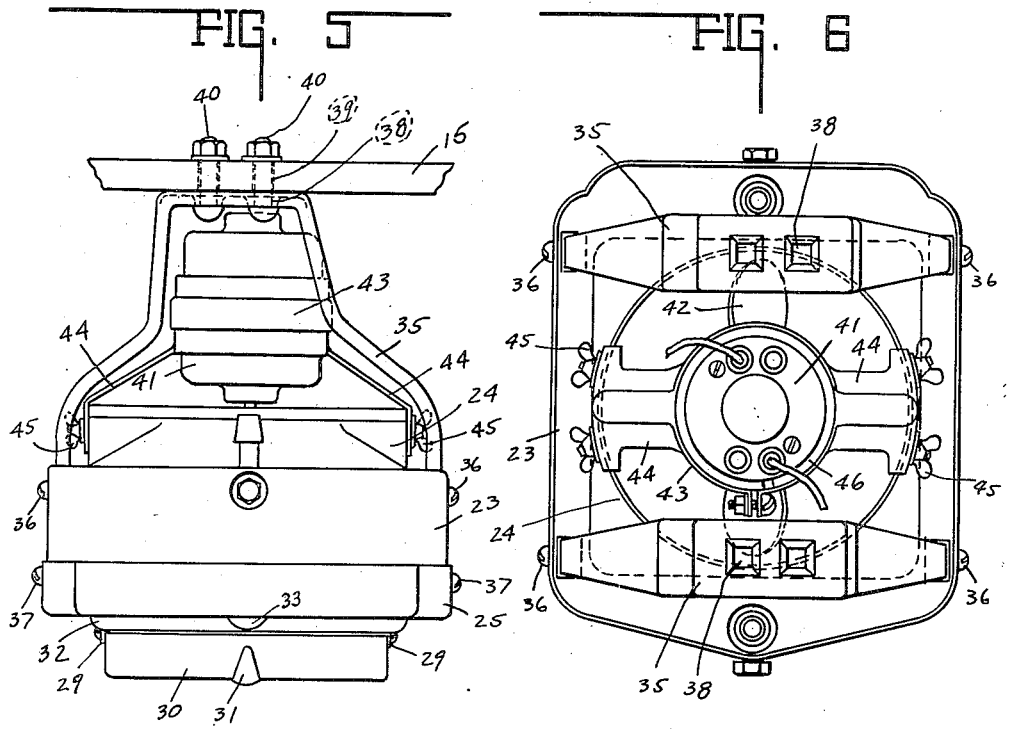

Patented Aug. 11, 1931

1,818,268

UNITED STATES PATENT OFFICE

QUINTIN G. NOBLITT, OF INDIANAPOLIS, INDIANA

HEATING APPARATUS FOR VEHICLES

Application filed August 17, 1929. Serial No. 386,619.

This invention relates to a heating unit particularly for use in automobiles. The heating unit hereinafter described is of the hot water type wherein a heating element is supplied with heated water from the circulating system of the automobile engine and wherein a motor driven fan is provided for directing a stream of air to be heated over the heating element and into the body of the automobile. However, certain features of the invention are applicable to other types of heaters and to heaters for other purposes than that specified.

One feature of the invention resides in the provision of means for selectively directing the stream of heated air in any desired direction and for controlling the volume thereof.

Another feature of the invention resides in the novel form of mounting the electric motor used to drive the fan.

Another feature of the invention resides in the novel form of bracket furnished for supporting the heater upon a portion of the automobile whereby two different positions of the heater are available without drilling a second set of holes in the support member.

Other features of the invention reside in the operative details of the construction which will be hereinafter set forth.

The full nature of the invention will be understood from the accompanying drawings and the following description and claims:

Fig. 1 is a general elevational view showing the attachment of the heater to the dash board of an automobile and the pipe connections for supplying heated water thereto. Fig. 2 is a front elevational view of the heater unit showing the air deflecting dampers. Fig. 3 is a similar view with the damper construction removed. Fig. 4 is a sectional view in elevation taken on the center line of the heater. Fig. 5 is a top plan view of the heater. Fig. 6 is a rear elevational view illustrating the mounting of the motor and other details.

In the drawings a gasoline engine for driving an automobile is indicated generally by the numeral 10. A radiator 11 is connected to the said engine by the usual hot water exit connection 12 and the usual cool water intake 13. A heater of the type hereinafter described is indicated generally by the numeral 14. The heater 14 is mounted upon the dash board 15 of the automobile and is connected to the hot water connection 12 by means of a flexible pipe 16 and to the cool water connection 13 by means of a flexible pipe 17.

The heater 14 contains a heating element consisting of an upper header 18, a lower header 19, water conduits 20 connecting the said headers and radiation fins 21. The header 18 is connected with the pipe 16 and the header 19 is connected with the pipe 17. Each of the headers 18 and 19 is provided with an ear 22 at each side. Surrounding the heating element and contacting with the ears 22 there is a shell member 23 having a rearwardly-extending circular portion 24 delineating an aperture for the entrance of air to be heated. A second shell member 25 surrounds a portion of the shell member 23 and includes inturned lip 26 delineating a substantially rectangular aperture. A frame member 27 is positioned within the said aperture and has a portion 28 extending between the lip 26 and the surface of the headers 18 and 19. The frame member 27 has outwardly-turned edges 29 delineating a substantially rectangular aperture for the exit of heated air. The edges 29 support a plurality of damper members 30, each having an upraised portion 31 in the edge thereof for the insertion of the operator's finger for manually moving the dampers. Each of the dampers is individually movable so that the volume as well as the direction of the air stream is controllable thereby.

The frame member 27 is provided with a rounded portion 32 contacting through the greater part of its circumference with the lip 26. The portion 32 is provided with depressed portions 33 centrally placed in each of the four sides. A tongue 34 forms part of the lip 26 of the shell member 25 and is centrally located in one side of the aperture. The tongue 34 is adapted to engage one of the depressions 33 and thereby hold the frame 27 in a fixed position. By removing the shell 25 and turning the frame 27 the tongue 34 may be made to engage with any one of the depressions 33. By this means the stream of air discharged through the exit aperture may be directed by the dampers in any one of four desired directions.

For supporting the heater upon the dash board 15 a plurality of brackets 35 are provided. The brackets 35 extend through openings in the rear of the shell 23 to positions adjacent the ears 22 as illustrated in Fig. 3. Fastening screws 36 pass through the shell 23, the ears 22 and threadedly engage the brackets 35. Other fastening screws 37 pass through both shell members 23 and 25 and the ears 22 and threadedly engage the brackets 35. Thus a single set of fastening members maintained the brackets, the shells and the heating element in their proper relation.

As illustrated particularly in Fig. 5, the brackets 35 are provided with holes 38 adapted to register with holes 39 provided in the dash board 15. Suitable fastening members 40 are provided for engaging said holes. It will be seen from Fig. 5 that the holes 38 are not symmetrically placed with respect to the center line of the heating unit. By this construction it is possible to reverse the brackets and thereby position the heating unit in two different positions with relation to the dash board 15 without drilling additional holes in the said dash board.

An electric motor 41 is provided for driving a fan 42 adapted to direct a stream of air to be heated through the heating element. For support of the motor there is provided a bracket member 43 preferably of one piece, pressed steel construction. As illustrated in Figs. 4 and 6 the bracket member is clamped about the motor and is provided with extended members 44 fastened to the shell member 23 by means of thumb screws 45. For preventing excessive shocks and vibration a resilient band 46, preferably of rubber, is provided between the clamping portion of the bracket member 43 and the motor frame.

The invention claimed is:

1. In a heater having a heating element and means for directing a stream of air to be heated over said heating element, the combination of a frame member having an aperture through which said stream of air is adapted to be passed, a plurality of individually manually operable dampers mounted in said frame and arranged in said aperture adapted to deflect said air stream and to control the volume thereof, and means for selectively positioning said frame member whereby said air stream may be selectively deflected in one of a plurality of directions.

2. The combination of a heating element adapted to heat a stream of air passed therethrough, a supporting shell for said heating element having an aperture therein for entrance of air to be heated, a second shell member, a frame member having a portion interposed between said heating element and said second shell and having an aperture therein for exit of heated air, fastening means for fastening said shells and said heating element together, and an adjustable damper mechanism mounted on said frame and positioned within the aperture of said frame member for controlling and directing said heated air.

3. The combination of a heating element adapted to heat a stream of air passed therethrough, a supporting shell for said heating element having an aperture therein for entrance of air to be heated, a second shell member, a frame member having a portion interposed between said heating element and said second shell and having an aperture therein for exit of heated air, fastening means for fastening said shells and said heating element together, and an adjustable damper mechanism mounted on said frame and positioned within the aperture of said frame member for controlling and directing said heated air, said frame member and said second shell member having an interlocking connection for maintaining said frame member in a fixed position.

4. The combination of a heating element adapted to heat a stream of air passed therethrough, a supporting shell for said heating element having an aperture therein for entrance of air to be heated, a second shell member, a frame member having a portion interposed between said heating element and said second shell and having an aperture therein for exit of heated air, fastening means for fastening said shells and said heating element together, and an adjustable damper mechanism mounted on said frame and positioned within the aperture of said frame member for controlling and directing said heated air, said frame member and said second shell member being provided with a tongue on one of said members and a plurality of receptacles on the other of said members for selectively engaging said tongue and thereby maintaining said frame member selectively in one of a plurality of fixed positions.

5. The combination of a heating element adapted to heat a stream of air passed therethrough, a supporting shell for said heating element having an aperture therein for entrance of air to be heated, a second shell member, a frame member having a portion interposed between said heating element and said second shell and having an aperture therein for exit of heated air, fastening means for fastening said shells and said heating element together, and an adjustable damper mechanism mounted on said frame and positioned within the aperture of said frame member for controlling and directing said heated air, said damper mechanism including a plurality of individually manually operable dampers each having an upraised portion in the rim thereof for reception of the finger of an operator for manual operation.

6. In combination, a heating element adapted to heat a stream of air passed therethrough, a supporting shell for said heating element having an aperture therein for entrance of air to be heated, a second shell having an aperture therein for exit of heated air, a supporting bracket for said heating element and a single set of fastening means for fastening together said shells and said bracket and for confining said heating element between said shells.

In witness whereof, I have hereunto affixed my signature.

QUINTIN G. NOBLITT.